(12) United States Patent
Braga et al.

(10) Patent No.: US 9,062,499 B2
(45) Date of Patent: Jun. 23, 2015

(54) LASER DRILLING METHOD AND SYSTEM

(75) Inventors: Arthur Martins Barbosa Braga, Rio de Janeiro (BR); Cicero Martelli, Rio de Janeiro (BR)

(73) Assignee: Faculdades Catolicas, Sociedade Civil Mantenedora Da PUC Rio, Rio de Janeiro (BR)

( * ) Notice: Subject to any disclaimer, the term of this patent is extended or adjusted under 35 U.S.C. 154(b) by 789 days.

(21) Appl. No.: 13/131,619

(22) PCT Filed: Nov. 30, 2009

(86) PCT No.: PCT/BR2009/000405
§ 371 (c)(1),
(2), (4) Date: Aug. 3, 2011

(87) PCT Pub. No.: WO2010/060177
PCT Pub. Date: Jun. 3, 2010

(65) Prior Publication Data
US 2011/0278270 A1 Nov. 17, 2011

(30) Foreign Application Priority Data

Nov. 28, 2008 (BR) ...................................... 0806638

(51) Int. Cl.
*B23K 26/00* (2014.01)
*E21B 11/02* (2006.01)
*E21B 7/14* (2006.01)
*B28D 1/14* (2006.01)
*H01S 3/00* (2006.01)
*H01S 3/13* (2006.01)

(52) U.S. Cl.
CPC . *E21B 7/14* (2013.01); *B28D 1/146* (2013.01); *H01S 3/0007* (2013.01); *H01S 3/1305* (2013.01)

(58) Field of Classification Search
USPC ..................... 219/121.6–121.86; 166/57–62; 175/17–23
See application file for complete search history.

(56) References Cited

U.S. PATENT DOCUMENTS

| | | | | |
|---|---|---|---|---|
| 4,090,572 A | * | 5/1978 | Welch | 175/16 |
| 6,762,835 B2 | * | 7/2004 | Zhang et al. | 356/318 |
| 7,490,664 B2 | * | 2/2009 | Skinner et al. | 166/57 |
| 2006/0013532 A1 | * | 1/2006 | Wan | 385/31 |

* cited by examiner

*Primary Examiner* — Sang Y Paik
(74) *Attorney, Agent, or Firm* — Laurence P. Colton; Smith Risley Tempel Santos LLC (57) ABSTRACT

A laser drilling system (100) for drilling rocks, soil and engineering materials with the aid of high-intensity laser light is described, which comprises an optical drill (104) for supplying laser light for the drilling of said materials provided with sensors (106); a control and operations center (101) comprising computer and supervising software with integrated logic; a cooling and debris withdrawal system (105) an energy source (102); an energy conductor (103) provided with sensors (107) and laser systems (201) for emitting high-intensity laser light and optical fibers (123) for conducting the so-generated laser light, so that the information collected by sensors (106), (107) supply said control and operations center (101) and said control and operations center (101) determines improved operation conditions of the optical drill (104) for the drilling of said solid materials or mixtures of solid and liquid materials relative to state-of-the-art drilling systems. The drilling method employing the system of the invention is also described.

21 Claims, 2 Drawing Sheets

LASER DRILLING METHOD AND SYSTEM

FIELD OF THE INVENTION

The present invention relates to the field of laser drilling systems, more specifically, to a laser drilling system and method for drilling rocks, soil and engineering materials with the aid of high-intensity laser light. The drilling system of the invention comprises auxiliary systems or subsystems designed for cooling, withdrawal of debris, sensing and imaging, positioning and control and system management as a whole (laser(s), optical fiber(s) and optical, mechanical and electronic devices). These subsystems are integrated to the main optical system.

BACKGROUND OF THE INVENTION

The drilling of wells utilizing high-intensity laser light was proposed in the seventies as an alternative to the drilling with mechanical drills, as per the references cited below in the present specification.

In this respect, U.S. Pat. No. 3,977,478 to Shuck states that laser drilling of subterranean earth formations is efficiently accomplished by directing a collimated laser beam into a bore hole in registry with the earth formation and transversely directing the laser beam into the earth formation with a suitable reflector. The bore hole is highly pressurized with a gas so that as the laser beam penetrates the earth formation the high pressure gas forces the fluids resulting from the drilling operation into fissures and pores surrounding the laser-drilled bore so as to inhibit deleterious occlusion of the laser beam. Also, the laser beam may be dynamically programmed with some time dependent wave form, e.g., pulsed, to thermally shock the earth formation for forming or enlarging fluid-receiving fissures in the bore.

U.S. Pat. No. 3,988,281 to Salisbury and Stiles describes a method of earth boring, useful for oil well drilling and the like, employs a high powered laser beam focused and directed by appropriate optics and/or scanning means to a vertically downwardly directed annular pattern. A fluid blast means directed generally into the bore hole is disposed adjacent the beam between the earth and the optics or scanning means. The beam and fluid blast are alternately pulsed and the fluid blast is effective to create thermal shock in the core to shatter it and to deflect material cleared from the hole by the laser beam away from the boring apparatus.

U.S. Pat. No. 4,066,138, also to Salisbury and Stiles relates to an earth boring apparatus mounted above ground which directs an annulus of high powered laser energy downwardly for boring a cylindrical hole by fusing successive annular regions of the stratum to be penetrated at a power level that shatters and self-ejects successive cores from the hole. A first fluid blast above the hole deflects the ejected core as it exits from the hole. A second fluid blast above the hole ejects fluid to provide adequate fluid at the strata to be penetrated prior to actuation of the laser for promoting a thermal shock capable of shattering and ejecting the core. Optical sensing separately detects the core shattering and the core ejection to control timed actuation of the system components. The described array comprises a plurality of lasers symmetrically disposed around a common center.

In spite of all the advantages associated to the utilization of this drilling method not based on the physical contact between the drill bit and the surface to be drilled, among which, the drilling rate, absence of physical contact between the drill and the surface to be drilled, energetic efficiency, among others, the utilization of lasers in wells has not been commercially developed as a result of the absence of lasers bearing the minimal power required for efficient and competitive drilling as compared to mechanical devices.

Further drawbacks which have limited the practical implementation of the laser drilling of wells were the laser dimensions which rendered impossible their insertion in the drilled boreholes as well as the non existence of efficient (that is, of low confinement losses, high transparency and susceptibility control to the induction of non-linear phenomena) optical conveyors (optical fibers) which would enable the guidance of the laser light to long distances and locations of reduced dimensions and difficult access.

U.S. Pat. No. 4,090,572 to Welch and U.S. Pat. No. 4,113,036 to Stout are also directed to laser drilling.

U.S. Pat. No. 4,199,034 also to Salisbury and Stiles relates to a method of perforating the sub-surface formation located in the area of an oil or gas well bore hole comprising directing a high powered coherent light beam axially along the bore hole to a predetermined depth therein from a surface location, deflecting the beam at said depth along a deflected beam axis, and successively focusing the beam at said depth to concentrate the beam at each of a plurality of spaced focal points along the deflected beam axis. It is alleged that the method provides a significant increase in the distance (length) to which the calculated oil or gas bearing formations can be perforated and provides an accurate determination of the exact near horizontal plane orientation of such perforations so that each can be aimed in the direction of the most promising formation pay zone.

In the end of the nineties and beginning of the years 2000 compact, high powered laser systems become commercially available and the interest in their utilization for drilling wells is renewed. Besides the development of high powered lasers (based on different topologies and active materials, such as gas, dye, semiconductor, crystal, doped or not optical fiber, and others) the development of high-transparency, low confinement losses and non-linearity control optical fibers (mono mode, multi mode and having a diversity of cross section refraction index profiles and materials) is another motivating drive for the utilization of high-intensity laser light for drilling.

Upon utilization of optical fibers it is possible to convey high-intensity laser light to long distances—a few dozens of kilometers—while keeping the quality of the laser light (intensity and temporal and spatial coherences) at the output end of the fiber sufficiently high to secure the delivery of high optical densities, a condition which improves the efficiency of the drilling process.

More recently, the patent literature points out the following documents relevant to the subject.

U.S. Pat. No. 6,365,871 to Knowles et al. refers to a method of laser-drilling a hole through a workpiece, such as an injector nozzle (40), into a cavity comprising drilling a hole (41) through the workpiece (40) with a laser (50), providing a fluid having laser-barrier properties in the cavity so that, when the hole (41) is open to the cavity, laserlight passing through the hole (41) is incident upon the fluid whereby the workpiece (40) across the cavity from the hole (41) is protected from the laserlight, and arranging that the fluid does not enter the laser-drilled hole (41) during the drilling process. Apparatus for performing the method is also described.

U.S. Pat. No. 6,626,249 to Rosa relates to a geothermal drilling and recovery system comprising a drilling rig having an elevator with a laser and a radar gun mounted on said elevator, a drill pipe, a rotating mirror mounted adjacent the lower end of said drill pipe and means for establishing a vacuum adjacent said lower end of said drill pipe to remove and recover heat and drilling debris therefrom.

U.S. Pat. No. 6,755,262 to Parker relates to an earth boring apparatus at least partially locatable within a borehole. The apparatus includes a plurality of optical fibers, each of which has a proximal fiber light energy input end and a distal fiber light energy output end. At least one focal lens is disposed at the distal fiber light energy output end. The focal lens is made up of a plurality of focal elements, each of which corresponds to the distal fiber light energy output end of at least one optical fiber. The focal lens is arranged to receive light energy from the corresponding distal fiber light energy output end of the at least one optical fiber and focus it outwardly from the distal fiber light energy output end.

U.S. Pat. No. 6,870,128 to Kobayashi et al. provides to a method for boring a well with a laser beam, the method comprising: shining the laser beam into a conduit, wherein the laser beam is guided through the conduit by the internal reflectivity of said conduit; and extending the conduit into the well, so that the laser beam exiting the conduit shines onto an area in the well to be bored. A system for boring a well with a laser beam is also provided, the system comprising: a means for shining the laser beam into a conduit; wherein the laser beam is guided through the conduit by the internal reflectivity of said conduit; and a means for extending the conduit into the well, so that the laser beam exiting the conduit shines onto an area in the well to be bored. An apparatus is provided as well, comprising a conduit that is extendable into the well, and an inner surface inside of the conduit, wherein the inner surface is reflective to the laser beam.

U.S. Pat. No. 6,880,646 to Batarseh relates to a method and apparatus for providing fluid flow into a wellbore in which an apparatus having at least one laser energy output is lowered into the wellbore and the at least one laser energy output is directed at a wall of the wellbore. At least a portion of the wall is heated using the at least one laser energy output, whereby flow of a fluid into the wellbore is initiated and/or- enhanced.

U.S. Pat. No. 6,888,097 also to Batarseh describes an apparatus for perforation of wellbore walls, which apparatus includes a fiber optic cable having a laser input end and a laser output end. A laser source is operably connected to the laser input end and a laser head is connected to the laser output end. The laser head includes a laser control components for controlling at least one laser beam characteristic. Laser head control elements for controlling the motion and location of the laser head are operably connected to the fiber optic cable. The laser head is enclosed in a protective housing, which protects the fiber optic cable and elements, such as reflectors and lenses for controlling the laser beam emitted by the fiber optic cable disposed therein, from the harsh environments encountered in downhole operations.

In U.S. Pat. No. 7,416,258 to Reed apparatus and methods of using lasers are provided for spalling and drilling holes into rocks. A rock removal process is provided that utilizes a combination of laser-induced thermal stress and laser induced superheated steam explosions just below the surface of the laser/rock interaction to spall the rock into small fragments that can then be easily removed by a purging flow. Single laser beams of given irradiance spall rock and create holes having diameter and depth approximately equal to the beam spot size. A group of the single laser beams are steered in a controllable manner by an electro-optic laser beam switch to locations on the surface of the rock, creating multiple overlapping spalled holes thereby removing a layer of rock of a desired diameter. Drilling of a deep hole is achieved by spalling consecutive layers with an intermittent feed motion of the laser head perpendicular to the rock surface.

Published U.S. Application N° 20080032152A1 to Vaughn et al. deals with the use of laser shock processing in oil and gas and/or petrochemical applications. The use includes subjecting friction stir weldments, fusion weldments, and other critical regions of ferrous and non-ferrous alloy components used in oil and gas and petrochemical applications to laser shock processing to create residual compressive stresses near the surface of the treated area. The residual compressive forces in the ferrous or non-ferrous components improve properties including, inter alia, surface strength, fatigue life, surface hardness, stress corrosion resistance, fatigue resistance, and environmental cracking resistance.

It should be pointed out that even for those patents providing the utilization of optical fiber(s) for deliver high-intensity laser light in bottom well locations no practical demonstrations of such possibility is provided when considered long fiber spans (deep wells, that is, >hundreds of meters). The main reason for this drawback is the induction of non-linear phenomena during high-intensity laser light propagation across long fiber spans. This is a classical problem in guided optics and several research groups and corporations have devoted efforts to reduce or eliminate it. In this respect see the reference by A. Mendes & T. F. Morse, "Specialty Optical Fibers Handbook", Chapter 22, pp. 671-696, Elsevier, 2007

Among the various laser technologies, it should be pointed out the development of optical fiber laser where the high-intensity laser light is generated within the optical fiber itself. This laser is compact and generally does not require cooling even when operating at high intensities (≥kW). Further, the losses by coupling of the light at the laser output end with a conducting optical fiber (in charge of conveying the high-intensity laser light across long distances up to the region of interest) are minimal since it is a matter of fiber-fiber coupling and not free space-fiber.

As for the wavelength of the laser light, high-powered lasers of varied wavelengths (from ultraviolet to infrared) are available according to the active element and of the design of the laser cavity, as well as tunable wavelength lasers. This means that according to the nature of the surface to be drilled, it is possible to utilize a drilling wavelength which is coincident with the absorption band of the surface-constituent material. This increases significantly the efficiency of the process. Thus, during drilling it is possible to select in real time the most suitable laser wavelength for that particular surface. This is a further technological advantage of the laser drilling relative to conventional mechanical systems.

Besides the increase in drilling efficiency it is possible to utilize the information related to the optimum drilling parameters, such as wavelength(s), intensity and lasers operation regime for identifying the constituents of the drilled surface, that is, it is possible to assess the physical chemical, spectroscopic and mechanical log (porosity and resistance of the constituent of the drilled surface, and other properties) of the substrate drilled along the drilling axis in real time during drilling.

Soil logging is particularly important in the mining industry utilizing explosives for forming the gravel which will be later on processed to extract the mineral of interest. If the amount of explosives is excessive or less than the required load for forming optimum sized gravel, the processing is less efficient which means inferior utilization of the rock potential.

SUMMARY OF THE INVENTION

Broadly, the drilling system of the invention makes use of high-intensity laser light to drill the surface of rocks and soil, mixtures of solid and liquid materials, cement and even metallic walls.

Auxiliary systems (herein called subsystems) for cooling, debris withdrawal, sensing and imaging and control, positioning and system management as a whole are integrated to the optical system (laser(s) and optical fiber(s)).

Thus, the invention provides a system which makes use of high-intensity laser light to drill the surface of rocks and soil, cement and even metallic walls combined to auxiliary systems for cooling, debris withdrawal, sensing and imaging and control, positioning and system management as a whole, integrated to the optical system (laser(s) and optical fiber(s)).

The invention provides also a method for drilling surface of rocks and soil with the aid of the described drilling system.

DETAILED DESCRIPTION OF THE INVENTION

According to the concept of the invention a laser light system means both tunable lasers and lasers of different wavelengths and lasers based on different technologies such as, gas, solid state, dye, crystal, optical fiber, and the like and pulsed or continuous emission lasers. Those are positioned either near the supplying source or alternatively near the optical drill as will be detailed hereinbelow.

The drilling system makes use of high-intensity light generated by laser systems for drilling on-land and offshore wells as well as lateral orifices in walls of already existing wells— thus replacing perforating guns.

The high-intensity laser light is conveyed to the surface to be drilled with the aid of optical fibers. According to the distance that the light should travel until the surface to be drilled, the laser light wavelength and the optical density required for the drilling, the optical fiber can be vitreous or crystalline, mono- or multi mode, of varied refraction indices profiles, isolated or disposed in groups or bundles.

Alternatively, optical devices selected among mirrors, lenses, prisms, diffraction networks, and the like are utilized to convey the light up to the surface to be drilled.

The operation principle is based on the breaking of the chemical linkages of the material(s) which make up the surface to be drilled by supplying high-intensity localized light so as to render the solid surface into particulate material. The solid particles resulting from the laser action on the surface are withdrawn from the well by means of a specialized system for debris withdrawal. According to the period of time of the laser light interaction with the surface it is possible to increase the mechanical rigidity of the well walls by melting and subsequent vitrification of the well walls.

This system makes use of fluids (liquids or gases) as a means for catching and transporting the particulate materials.

Simultaneously to the drilling process, photo-luminescent and spectroscopic sensors characterize the emission and absorption bands both of the surface being drilling and the particulate material resulting from the interaction of the laser light with the well. This real time monitoring of the optical properties of the surface being drilled constitutes a relevant improvement in well logging characterization techniques.

Further, measured data feed the drilling system control and automation subsystem in charge of adjusting the most efficient drilling conditions, among which the laser light intensity, wavelength and emission regime.

Pressure, temperature, deformation and other parameters (physical and chemical) sensors based on thermo-electric, electro-resistive, thermo-optical, electro-optical, elasto-optical, electrochemical or photochemical conversion are inserted in several locations of the inventive drilling system and enable the continuous monitoring of the drilling process in real time.

In general terms, the laser drilling system of the invention for the drilling of solid materials or mixtures of solid and liquid materials comprises:

a) an optical drill (104) for supplying laser light for the drilling of said materials, said optical drill (104) being provided with sensors (106), said sensors (106) being connected via bus (17) to b) a control and operations center (101) comprising computer and supervising software with integrated logic, said control and operations center (101) being on its turn connected to i) a cooling and debris withdrawal system (105) via bus (13), the said system (105) being connected via pipe (14) to said optical drill (104); ii) an energy source (102) via bus (10); and iii) the said optical drill (104) via bus (19);

c) an energy conductor (103) provided with sensors (107) connected to said control and operations center (101) via bus (18), said energy conductor (103) being connected to i) said energy source (102) via bus (11); ii) said cooling and debris withdrawal system (105) via (20); iii) said control and operations center (101) via bus (18); and optical drill (104) via bus (12); and d) laser systems (201) for emitting high-intensity laser light and optical fibers (123) for conducting the so-generated laser light, so that the information collected by sensors (106), (107) supply said control and operations center (101) and said center (101) determines improved operation conditions of the optical drill (104) for the drilling of said solid materials or mixtures of solid and liquid materials relative to state-of-the-art drilling systems.

The invention will now be described in relation to the attached Figures. It should be clear to the experts that many variations and modifications can be made in same without departing from the scope of the invention.

Figure 1:
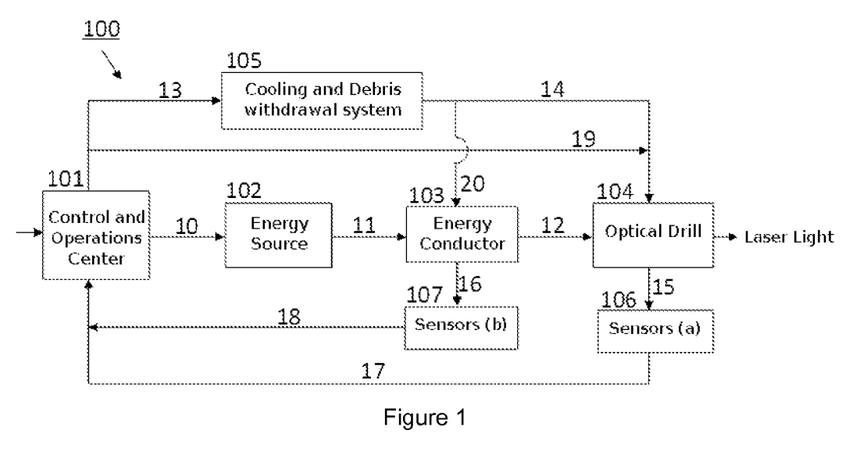
FIG. 1 attached is a simplified flow sheet of the laser drilling system according to the invention.

The control loop of the present laser light drilling system, generally designed by numeral (100) is depicted in FIG. 1.

According to FIG. 1, each block corresponds to the specific function performed by the subsystem integrated to said laser light drilling system (100). The subsystems (functions) exchange information (control variables, information, energy, and the like) one with the other through interconnection lines, represented in the control loop of FIG. 1 by solid lines, while the direction of the information transfer is represented by arrows.

It should be clear to the experts that lines (15) and (16) of FIG. 1 do not represent any physical device but simply the transfer of variables respectively from the optical drill/energy conveyor towards sensors (106)/(107). Physically the physical contact optical drill-sensor is sufficient for data transmission of variables.

The control loop is the backbone of the drilling system and, although it does not deliver information on the physical disposition of the subsystems in the drilling system, it informs precisely the way the control loop and the drilling system interact to build an automated and smart system able to drill several kinds of surfaces and under diverse pressure and temperature conditions.

Figure 2:
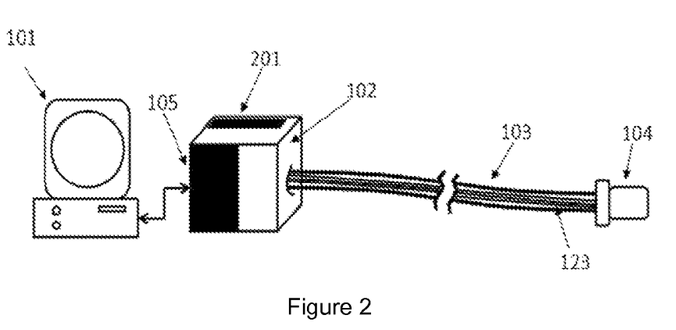
FIG. 2 attached is a schematic physical diagram of one of the possible laser drilling subsystems based on the control loop set in FIG. 1, where the laser systems are positioned near the energy source.
Figure 3:
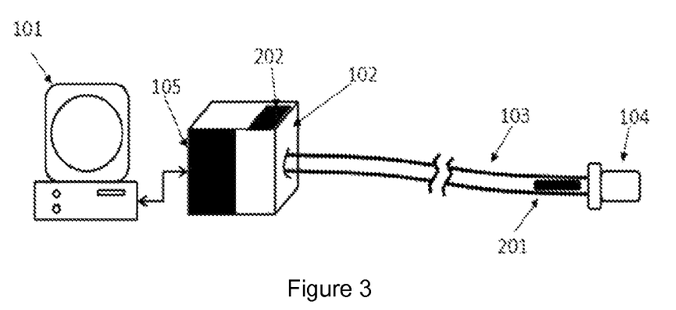
FIG. 3 is a schematic physical diagram of an alternative laser drilling subsystem based on the control loop set in FIG. 1, where the laser systems are positioned near the optical drill.

FIGS. 2 and 3 correspond to schematic physical diagrams of two possible laser drilling systems based on the control loop depicted in FIG. 1.

In these two Figures it is possible to observe the physical arrangement of each subsystem.

The basic difference between these two diagrams is that in FIG. 2 the laser subsystems are located near the energy source and in FIG. 3 they are located near the optical drill. These arrangements demonstrate the design flexibility of the laser drilling system object of the invention.

The subsystems are described as per hereinbelow.

Control and Operations Center (101)

The drilling control is completely automatic. Alternatively it can be manual or still alternatively, mixed.

The drilling system control, automation, monitoring and decision making center is designed in FIGS. 1, 2 and 3 by numeral (101).

Said control and operations center (101) commands: i) the energy source (102) through bus (10); ii) the positioning of the drill tip (or optical drill) (104); and iii) the cooling and withdrawal debris system (105) through buses (19) and (13), respectively.

Besides, the control center (101) receives information from sensors (106) and sensors (107) through buses (17) and (18), respectively, which aid in the decision making of the drilling process.

The control and operations center (101) comprises a computer and supervisory software with integrated logic.

Energy Source (102)

The energy source (102) for the drilling process originates from an engine-generator group, a photovoltaic panel, a wind power generator, a battery, a Peltier generator, and the like, located in a terrestrial (truck) or maritime (ship or submarine) vehicle or on the surface of or even on the sea bed.

According to one mode of the invention, the high-intensity laser light system (201) is located near the said energy source (102), as depicted in FIG. 2.

The energy source (102) receives control information from said control and operations center (101) by bus (10) and conveys information (in this case high-powered energy and control variables) to the energy conductor (103) by means of bus (11).

Conductor (103) is metal conductor(s) or optical fiber(s) selected among vitreous or crystalline, mono- or multimode, with varied refractive index profiles, arranged in bundles or in individual form according to the position of the laser light system (201) represented in FIGS. 2 and 3. Thus if the laser light system (201) is near the energy source (102) according to FIG. 2, energy conductor (103) is an optical fiber.

On the other hand, if the laser light system (201) is near the optical drill (104) according to FIG. 3, said conductor (103) is a metallic conductor.

Energy Conductor (103)

Energy conductor (103) conveys both the light emitted by the laser light system (201) whenever this latter is located near the energy source (102) up to the optical drill (104) (as is schematically depicted in FIG. 2) or alternatively energy conductor (103) conveys electricity for supplying the laser light system (201) when this latter is located near the optical drill (104) (as is schematically depicted in FIG. 3).

Besides conveying energy said conductor (103) contains sensor devices (107) based on different techniques, for example, optical fibers, said sensor devices (107) being located along the extension of said conductor (103) aiming at monitoring mechanical efforts (strains and pressure) and temperature besides the analysis of the properties of the well walls constituent during the drilling process in localized, semi-distributed and distributed fashion.

The energy conductor (103) receives information from the energy source (102) by a bus (11) (which is a metallic conductor or optical fiber, vitreous or crystalline, mono- or multi mode, of varied refractive index profiles, arranged in bundles or not).

The energy conductor (103) conveys information (high-intensity energy) to said optical drill (104) by a bus (12) selected among metallic cable or optical fiber made up of vitreous or crystalline substance, mono- or multi mode, of varied refractive index profiles, arranged in bundles or not.

Optical Drill (104)

The optical drill (104) is also designed as drill tip and its main function is to supply high-intensity light to the surface to be drilled, to monitor the drilling process and make possible the withdrawal of the debris generated by the laser action on the surface to be drilled. In this way, most of the subsystems are directly interconnected or integrated to the said optical drill (104).

Thus, sensors (106) are placed directly in said optical drill (104), the cooling and debris withdrawal system (105) withdraws heat from the said optical drill (104) and supplies the fluids required for the withdrawal of the drilling debris while the laser system (201) supplies high-intensity light to said optical drill (104) to be used in the drilling and so on.

Therefore the functions of said optical drill (104) can be described as: 1) focusing and distribution of high-intensity light on the surface to be drilled; 2) self-positioning (translation, angular and rotational movements); and 3) fluid injection for the protection of the optical parts of the same, withdrawal of the drilling debris and cooling of the optical, mechanical and electrical systems as a whole.

In one mode of the invention the said laser system (201) is located near the energy source (102) according to FIG. 2 and thus the energy conductor (103) is made up of optical fibers (vitreous or crystalline, mono- or multimode, of varied refraction index profiles, arranged in bundles or not) and supplies high intensity laser light to the said optical drill (104).

In an alternative mode of the invention, the high intensity laser system (201) is located near the said optical drill (104) as can be seen in FIG. 3. In this case the energy conductor (103) is in charge or supplying electricity to the said laser system (201).

Cooling and Debris Withdrawal System (105)

System (105) is hydraulic, pneumatic or mixed hydraulic-pneumatic, being in charge of the cooling and thermal stabilization of the energy conductor (103) with the aid of device (20) (which can be just a cooling pipe or a heat exchanger) and of all the systems integrated in the drilling tip (104) through pipe (14). Pipe (14) means pipes for fluid injection for withdrawal of debris resulting from the laser action and suction of the mixture of the injected fluids with the solid debris.

System (105) is controlled by said control and operations center (101) with the aid of bus (13). The same fluids utilized in the cooling can equally be used for the withdrawal of drilling debris.

Alternatively, independent fluids can be utilized for each function, cooling or withdrawal of drilling debris.

The fluids from the cooling and debris withdrawal system (105) are in charge of the insulation of the optical fibers of the energy conductor (103) against $H_2$ infiltration—the presence of $H_2S$ is not uncommon in petroleum wells and the diffusion of Hydrogen in the interior of silicon optical fibers can degrade the fiber optical properties. This is the reason why there is a need to protect the fibers against Hydrogen diffusion.

Figure 4:
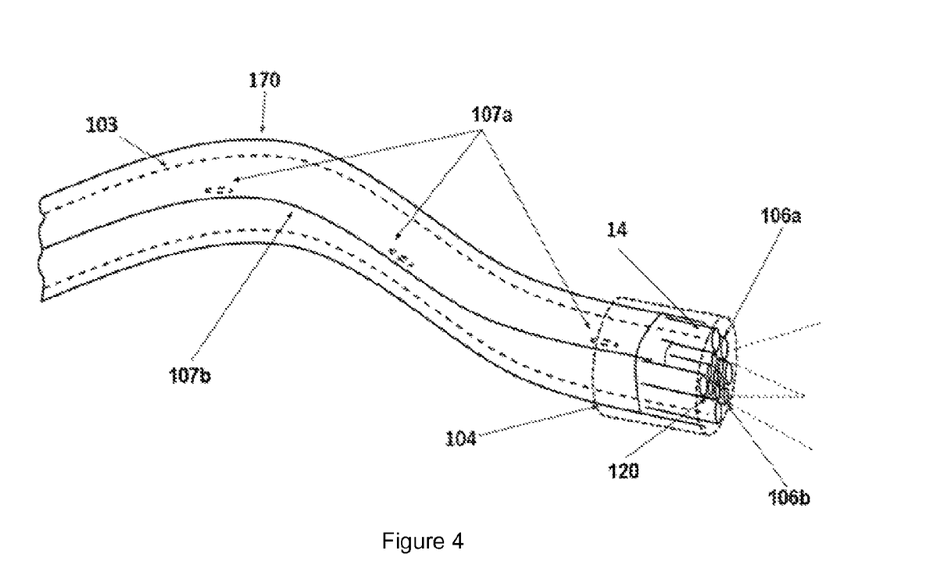
FIG. 4 is a schematic flow sheet of a mode of optical drill according to the invention and drilling pipe including details of some of the subsystems.

Cooling and debris withdrawal system (105) conveys and withdrawals fluids for the withdrawal of debris on the surface drilled by drill tip (104) through pipe (14). The end of pipe (14) for the circulation of cooling fluids and drilling debris withdrawal is depicted in FIG. 4.

Sensors (106)

This is a set of sensor devices, which can be localized, semi-distributed and distributed, based on thermo-electrical, electro-resistive, thermo-optical, electro-optical, elasto-optical, electrochemical or photochemical conversion. The said set of sensors (106) is in charge of monitoring the operation conditions of the various systems located in the optical drill (104) including temperature assessment, mechanical efforts, pressure and optical degradation, etc.); monitoring of the drilling debris (spectroscopic and photochemical sensors); real time imaging of the surface drilled by optical drill (104); and geopositioning system for the control of the direction of drilling with the aid of the optical drill (104) mechanical positioning systems.

The interface of sensors (106) with the said optical drill (104) is represented by line (15) in the control diagram of FIG. 1.

The information obtained through the assessments performed are conveyed to said control and operations system (101) by bus (17) and utilized for the making of decision on the drilling process and for the determination of the properties of materials which constitute the drilled surface.

Optical Fiber Group (106a)

These optical fibers (106a) (vitreous or crystalline, mono- or multimode, of varied refraction index profiles, arranged in bundles or not) are designed for the real time imaging of the surface to be drilled, of the drilling process and of the pipe walls.

The imaging system is represented by sensors (106) of the control loop of the high intensity laser light-based system (100).

Sensing Optical Fibers (106b)

These are optical fibers (vitreous or crystalline, mono- or multimode, of varied refraction index profiles, arranged in bundles or not) for spectroscopic and photo luminescent assessment of the surface to be drilled and of the by-products of the laser drilling process. This spectroscopic sensing system is a group of localized sensors which makes up the plurality of sensors called sensors (106) of the control loop of the high-intensity laser light-based drilling system (100).

Sensors (107)

Sensors (107) is a set of sensor devices (based on thermo-electrical, electro-resistive, thermo-optical, electro-optical, elasto-optical, electrochemical or photochemical conversion) in charge of monitoring the operation conditions of the energy conductor (103), that is, assessment of temperature in localized, semi-distributed or distributed way, mechanical efforts in defined regions and/or in distributed way and spectroscopic analysis of the well walls in localized, semi-distributed or distributed way along the said energy conductor (103).

The interface of said sensors (107) with the energy conductor (103) is represented by line (16) in the control diagram of FIG. 1.

The information obtained by sensors (107) is used by the control and operations center (101) (conveyed by (18)—variables transmission bus) for decision making on the drilling process.

Besides, sensors (107) supply to said control and operation center (101) information on the physical chemical composition of the several materials along the drilled well.

As previously discussed, two possible configurations or modes for the high-intensity laser light drilling system (100) of the invention are envisaged.

According to one configuration, lasers (201) are based on a static unit (terrestrial, maritime or submarine) (not represented) near the energy source (102) and cooling system (105) as depicted in FIG. 2, where the laser light is transmitted up to the optical drill (104) by optical fibers.

In an alternative configuration, lasers (201) are located near the optical drill (104) inside a drill pipe (170) (not represented), as depicted in FIG. 3. In this configuration, a laser control and power supplying unit (202) is remotely located near the energy source (102) and the cooling and debris withdrawal system (105). Unit (202) is fed by the said energy source (102).

Sensors (107a)

These sensors are located along the said energy conductor (103) and the drilling pipe (170). They are a group of localized and semi distributed sensors which make up the plurality of sensors known as sensors (107) of the control loop of high intensity laser light-based system (100) (see FIG. 1).

Sensors (107b)

These sensors are distributed along the said energy conductor (103) and the drilling pipe (170). They are a group of distributed sensors which make up the plurality of sensors known as sensors (107) of the control loop of high-intensity laser light-based system (100) (see FIG. 4).

Components of FIGS. 2 and 3 are described hereinbelow:

Laser System (201)

This system is formed by high-intensity laser emitting devices (gas, solid state, dye, crystal, optical fiber, and the like) which are in charge of generating the optical energy utilized for drilling.

Advantageously, it is possible to optimize the drilling process by tuning the high-intensity laser light operation wavelength(s) from the energy source (102) and operation regime of said laser light system (201).

Power Supply Source (202)

Power supply source (202) is the unit in charge of the power supply for the laser light system (201). It is fed by the energy source (102) through the said energy conductor (103) and conditions the electrical supplying signal to the needs of the said laser light system (201).

A schematic sheet of one mode of optical drill (104) and drill pipe (170) with details of some of the subsystems is depicted in FIG. 4.

According to FIG. 4 optical drill (104) is limited by the device drawn in dotted lines. The components which make up optical drill (104) and drill pipe (170) are described hereinbelow.

Conducting Optical Fibers (120)

Those are high-intensity laser light conducting optical fibers (vitreous or crystalline, mono- or multimode, of varied refraction index profiles, arranged in bundles or not). These optical fibers (120) are in charge of delivering energy to the surface to be drilled. Physically said optical fibers (120) are the continuation of the high-intensity laser light conducting optical fibers (123) of FIG. 2.

Alternatively, optical fibers (120) are special fibers of lower divergence or of negative divergence at the output end, for example, which are emended to said energy-conducting optical fibers (123).

Optical fibers (123) are high-intensity laser light energy conducting optical fibers depicted in FIG. 2.

Drill Pipe (170)

Drill pipe (170) is a protecting wrapping for all the parts which make up the subsystems of the drilling system (100) object of the invention, said parts being inserted in the well drilled during the drilling process.

The drilling method of solid materials making use of the system (100) of the invention leads to the physical chemical, spectroscopic and mechanical log (porosity, compaction of the constituent material of the drilled surface, etc) of the well drilled as a result of the smart optimization in real time of the laser drilling process.

The drilling method of the invention comprises the following steps which will be described hereinbelow in the present specification.

Optical drill (104) is attached to the drill string (not represented) and positioned perpendicularly and at an optimum distance of the surface to be drilled by the control action executed by the control and operations center (101) and control sets conveyed to the optical drill (104) by bus (19).

The optimal drilling distance is defined as the distance between said optical drill (104) and the surface to be drilled. Drilling at the optimal distance of the surface to be drilled results in more efficient drilling, this meaning either drilling rate or quality of the hole. Said distance can coincide, for example, with the region of higher laser light density at the output end of the said optical drill (104), or with the region where the laser interaction with the surface material is more adequate to the drilling procedure.

The optimum drilling distance depends primarily on the constituent of the surface to be drilled, since it is the nature of this constituent which defines the laser light system (201) operation wavelength(s), the intensity of the laser light and the laser light operation regime (continuous or pulsed).

The determination of the optical properties of the constituent of the surface to be drilled including absorption, reflectivity and optical emission is performed by sensors (106). It should be pointed out that said sensors (106) also perform the imaging of the surface to be drilled.

Such information is conveyed to the control and operations center (101) through bus (17) and utilized for the definition of the laser light system (201) operation wavelength(s), the intensity of the laser light and the laser operation regime (continuous or pulsed).

The optimum operation distance is defined on the basis of the definition of said parameters. The parameter "optimal operation distance" is consequently conveyed to the optical drill (104) through control bus (19) so as to locate said optical drill (104) at the established distance. The determination of the relative distance between the optical drill (104) and the surface to be drilled is performed by sensors (106).

The information of the distance measured by sensors (106) is conveyed to the control and operations center (101) by bus (17).

The mechanical rigidity which is desired to obtain for the well walls is relevant information to define the laser light system (201) operation regime since said mechanical rigidity depends on the exposure period of the constituent of the surface to be drilled to the high-intensity laser light. Broadly, there is a directly proportional relationship between the laser light period of interaction-surface to be drilled and the rigidity obtained in the well walls.

Advantageously, the mechanical rigidity of the well walls (resulting from drilling) is augmented through the vitrification of the well walls constituent. This process results from the melting of the well wall constituent in the borderline region of the section being drilled when submitted to the laser action and consequent solidification of the well walls constituents after the cooling which follows the absence of laser excitation.

Once the drilling optical parameters are defined, including laser light intensity and laser light emission regime, and the drilling distance using as reference the optical properties of the constituent material of the surface to be drilled, the control and operations center (101) defines the initial flow of fluids for cooling the optical drill (104) and perform debris withdrawal resulting from the laser action on the surface to be drilled using pipe (14).

Then, the control and operations center (101) conveys the command for cooling and debris withdrawal to the cooling and debris withdrawal system (105) through control bus (13).

The temperature of the optical drill (104) as well the efficiency in the debris withdrawal by the cooling and debris withdrawal fluids are respectively monitored by sensors (106). Information acquired by said sensors (106) is conveyed to the control and operations center (101) via bus (17).

Once the initial definition of the drilling parameters (optical and cooling and debris withdrawal parameters) is established, the control and operations center (101) conveys a control order to the energy source (102) by bus (10) so that source (102) feeds the said laser system (201) with the aid of energy conductor (103). This is depicted in FIG. 2.

On the other hand, in the mode of the invention where laser light system (201) is located near the said optical drill (104), the energy source (102) supplies electricity to the laser energy source (202) as depicted in FIG. 3. In this mode the energy conductor (103) is cooled by the cooling and debris withdrawal system (105) by (20) and continuously monitored by sensors (107). The information is conveyed to the control and operations center (101) by bus (18).

The high intensity laser light generated by the laser system (201) is consequently directed to the surface to be drilled by the optical drill (104). Following interaction of the high intensity laser light with the surface constituent, solid and/or particulate debris are generated and removed by the cooling and debris withdrawal system (105).

As the drilling of the surface proceeds, the optical drill (104) is shifted towards the drilling direction (perpendicular to the surface), always keeping the optimum distance which is continuously defined by the operations and control center (101) resulting from the continuous monitoring of the surface and its constituents and of the debris resulting from the laser action by sensors (106). In this way the drilling conditions are optimized in real time during the whole of the drilling process.

The information supplied by sensors (106) for the optimization of the drilling conditions and by sensors (107) is treated and as a result the physical chemical, spectroscopic and mechanical log of the well is obtained (porosity, strength of the drilled surface, etc) as a function of the depth of same.

In this way the present method is also applicable to the logging of the properties of the well materials.

The advantages of the inventive drilling system and associated method are as follows:
  a. increased drilling efficiency, that is, reduced drilling time;
  b. reduced number of mobile mechanical parts in the drilling system;
  c. in situ monitoring of the drilling process, with consequent increase in the process control;
  d. ability to drill different materials, including rocks of different compositions, metals, and the like without the need to replace the drill tip. According to the material to be drilled different laser light wavelengths can be worked to increase drilling efficiency;

e. reduced maintenance costs;

f. reduced risks of tectonic movements caused by drilling in view of the absence of contact between the optical drill (104) (FIG. 1) and the surface to be drilled; and g. reduced dimensions as well as reduced weight of the drilling system relative to state-of-the-art systems.

The invention claimed is:

1. A system for laser drilling of solid materials or mixtures of solid and liquid materials, wherein said system comprises:
   a) an optical drill (104) for supplying laser light for drilling said materials, said optical drill (104) being provided with first sensors (106), said first sensors (106) being connected via first bus (17) to:
   b) a control and operations center (101) comprising computer and supervising software with integrated logic, said control and operations center (101) being in its turn connected to i) a cooling and debris withdrawal system (105) via second bus (13), the said cooling and debris withdrawal system (105) being connected via pipe (14) to said optical drill (104); ii) an energy source (102) via third bus (10); and iii) the said optical drill (104) via fourth bus (19);
   c) an energy conductor (103) provided with second sensors (107) connected to said control and operations center (101) via fifth bus (18), said energy conductor (103) being connected to i) said energy source (102) via sixth bus (11); ii) said cooling and debris withdrawal system (105) via seventh bus (20); iii) said control and operations center (101) via fifth bus (18); and said optical drill (104) via eighth bus (12); and
   d) laser systems (201) for emitting high-intensity laser light and optical fibers (123) for conducting the so-generated laser light, so that information collected by the first and second sensors (106), (107) is supplied to said control and operations center (101) and said control and operations center (101) determines improved operation conditions of the optical drill (104) for the drilling of said solid materials or mixtures of solid and liquid materials relative to state-of-the-art drilling systems, and wherein the said cooling and debris withdrawal system (105) supplies fluids to the surface to be drilled for cooling the said optical drill (104) within a drill pipe (170), withdraws heat from the said optical drill (104) by removing the fluids from the said drill pipe (170), and withdraws debris generated by the said optical drill (104) action on the surface to be drilled also by removing the fluids containing the debris from the said drill pipe (170).

2. The system according to claim 1, wherein the said optical drill (104) performs the functions of: i) focusing and distribution of the high-intensity laser light on the surface to be drilled; ii) self-positioning by performing translation, angular and rotation movements; and iii) injection of fluids for protecting the optical parts of the said optical drill (104), and removing the debris resulting from the drilling and cooling of the optical, mechanical and electrical systems.

3. The system according to claim 2, wherein the said first sensors (106) are selected from the group consisting of localized, semi-distributed and distributed sensors and are in charge of i) monitoring the operation conditions of the various systems disposed in the said optical drill (104) including temperature assessment, mechanical efforts, pressure and optical degradation; ii) monitoring of the debris resulting from the drilling with the aid of spectroscopic and photochemical sensors; iii) imaging in real time of the surface drilled by the said optical drill (104); and iv) performing geopositioning for the control of the direction of drilling with the aid of the mechanical positioning systems of said optical drill (104).

4. The system according to claim 3, wherein the said second sensors (107) of the energy conductor (103) are in charge of: i) monitoring the operation conditions of the said energy conductor (103); ii) assessing the localized, semi-distributed and distributed temperature along the said energy conductor (103); iii) mechanical efforts in defined, distributed regions along the said energy conductor (103); and iv) spectroscopic analysis of the constituent materials of well walls in localized, semi-distributed and distributed mode along the said energy conductor (103).

5. The system according to claim 1, wherein the said second sensors (107) of the energy conductor (103) are in charge of: i) monitoring the operation conditions of the said energy conductor (103); ii) assessing the localized, semi-distributed and distributed temperature along the said energy conductor (103); iii) mechanical efforts in defined, distributed regions along the said energy conductor (103); and iv) spectroscopic analysis of the constituent materials of well walls in localized, semi-distributed and distributed mode along the said energy conductor (103).

6. The system according to claim 5, wherein the second sensors (107a) are a group of sensors localized and semi-distributed located along the said energy conductor (103) and along a drill pipe (170).

7. The system according to claim 5, wherein the second sensors (107b) are a group of distributed sensors located along the said energy conductor (103) and along the said drill pipe (170).

8. The system according to claim 1, wherein the laser light system (201) is located near the said energy source (102).

9. The system according to claim 8, wherein the said energy conductor (103) conveys the light emitted by said laser light system (201) up to the said optical drill (104), said energy conductor (103) being made up of optical fibers selected from the group consisting of vitreous, crystalline, monomode, and multimode optical fibers, with varied refractive index profiles, arranged either individually or in bundles.

10. The system according to claim 1, wherein the said laser light system (201) is located near the optical drill (104) and within the said drill pipe (170), a unit (202) supplied by the energy source (102) and designed for control and supply of the said laser system (201) being installed remotely together with the said energy source (102) and the cooling and debris withdrawal system (105).

11. The system according to claim 10, wherein said energy conductor (103) is metallic and conveys electricity for supplying to the laser light system (201).

12. The system according to claim 1, 8 or 10, wherein the operation wavelength(s) of the high-intensity laser light and the laser light system (201) regime are tuned.

13. The system according to claim 1, wherein the cooling and debris withdrawal system (105) is selected from the group consisting of hydraulic, pneumatic, and mixed hydraulic-pneumatic systems, and is in charge of cooling and thermal stabilization of i) the energy conductor (103) through a device (20) selected from the group consisting of cooling pipe and heat exchanger, and ii) all of the systems are integrated in the said optical tip (104) through the pipe (14).

14. The system according to claim 13, wherein the pipe (14) comprises pipes for i) injection of fluids and withdrawal of debris resulting from the action of the laser light and ii)

suction of the mixture of injected fluids with the solid debris, the injected and withdrawn fluids being the same or different.

15. The system according to claim 1, wherein the delivery of the energy to the surface to be drilled is performed with the aid of high-intensity laser light conducting optical fibers (120), said optical fibers being physically the continuity of energy-conducting optical fibers (123).

16. The system according to claim 15, wherein said optical fibers (120) are optical fibers of lower divergence or negative divergence at the output end, and are emended to said energy-conducting optical fibers (123).

17. The system according to claim 1, wherein the system is employed in perforation gun operations in oil and gas wells.

18. A method for drilling solid materials with the aid of the system according to claim 1, wherein said method comprises the steps of:
   a) fixing the optical drill (104) to a drill string and positioning said optical drill (104) perpendicularly and at optimal distance from the surface to be drilled by the control action executed by the said control and operations center (101) and control commands conveyed to said optical drill (104) by the fourth bus (19);
   b) allowing that the first sensors (106) installed in the said optical drill (104) perform: i) assessment of the optical properties of the constituent materials of the surface to be drilled, including absorption, reflectivity and optical emission; ii) imaging of the surface to be drilled; and iii) assessment of the relative distance between the said optical drill (104) and the surface to be drilled;
   c) conveying such information obtained in step b) to the control and operations center (101) by the first bus (17) and making use of said information for establishing the optimal operation distance;
   d) conveying the parameter "optimal operation distance" to said optical drill (104) by the fourth bus (19) so that said optical drill (104) is positioned at the established distance;
   e) based on the information received by said control and operations center (101), defining from said control and operations center (101) a command by the second bus (13) to the cooling and debris withdrawal system (105) for cooling the said optical drill (104) and withdrawing debris resulting from the laser action on the surface to be drilled with the aid of the pipe (14);
   f) with the aid of the first sensors (106), perform the assessment of the optical drill (104) temperature as well as the efficiency of the debris withdrawal by cooling and withdrawal debris fluids respectively, and thereafter conveying the information obtained to the control and operations center (101) via the first bus (17);
   g) from the control and operations center (101), conveying a control command to said energy source (102) via the third bus (10) so as to supply the laser light system (201) with the aid of energy conductor (103);
   h) directing the high intensity laser light generated by the laser light system (201) on the surface to be drilled by optical drill (104), so that the interaction of said high-intensity laser light with the material which constitutes the surface generates solid, particulate debris to be removed by the cooling and debris withdrawal system (105);
   i) performing the drilling of the said surface under optimized drilling conditions, with the optical drill (104) moving in the drilling direction perpendicular to the said surface, the optimal distance optical drill (104) surface being kept by the definition in real time performed by the control and operations center (101) following continuous monitoring of the said surface and its materials and of the debris resulting from the laser action by the first sensors (106); and
   j) through the said cooling and debris withdrawal system (105), supplying fluids to the surface to be drilled for cooling the said optical drill (104) within a drill pipe (170), withdrawing heat from the said optical drill (104) by removing the fluids from the said drill pipe (170), and withdrawing debris generated by the said optical drill (104) action on the surface to be drilled also by removing the fluids containing the debris from the said drill pipe (170).

19. The method according to claim 18, wherein when the said laser system (201) is located near the said optical drill (104), the energy source (102) supplies electricity to the energy laser source (202) and the energy conductor (103) is cooled by the cooling and debris removal system (105) via a device (20) selected from the group consisting of cooling pipe and heat exchanger while being continuously monitored by the second sensors (107), the information being conveyed to the control and operations center (101) by the fifth bus (18).

20. The method according to claim 18, wherein the high-intensity laser light operation wavelength(s) and the laser system (201) regime are tuned.

21. The method according to claim 18, further comprising the step of using the said second sensors (107) of the energy conductor (103) for: i) monitoring the operation conditions of the said energy conductor (103); ii) assessing the localized, semi-distributed and distributed temperature along the said energy conductor (103); iii) mechanical efforts in defined, distributed regions along the said energy conductor (103); and iv) spectroscopic analysis of the constituent materials of well walls in localized, semi-distributed and distributed mode along the said energy conductor (103).

* * * * *